Patented Jan. 26, 1954

2,667,498

UNITED STATES PATENT OFFICE 2,667,498

SELECTIVE DEHALOGENATION OF CERTAIN HALOGENATED KETONES

Percy L. Julian, Maywood, and William J. Karpel, Chicago, Ill., assignors to The Glidden Company, Cleveland, Ohio, a corporation of Ohio No Drawing. Application September 17, 1949,
Serial No. 116,415

10 Claims. (Cl. 260—397.4)

The present invention relates to a process useful in the production of steroid compounds having a 17α-hydroxy group, and particularly relates to a process for producing 17-bromo-20-keto pregnenes and pregnanes.

In a broad program for the preparation of 17α-hydroxy-20-keto and 17α-hydroxy-20-hydroxy pregnenes and pregnanes (I), it is desirable to have a clean-cut route to 17-bromo-20-keto pregnenes and pregnanes (II). These latter are excellent precursors for the corresponding $\Delta^{16,17}$-20-keto compounds (III), which, themselves, are readily converted into the appropriate 16,17-oxido-20-keto pregnenes and pregnanes (IV).

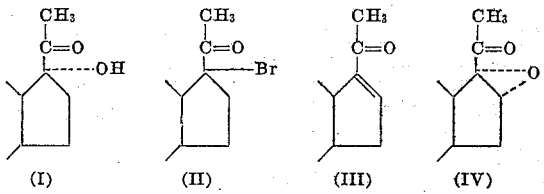

The procedures hitherto described in the literature, Marker et al., J. A. C. S., 64, 1276 (1942); Marker and Crooks, U. S. Patent 2,369,065; Inhoffen, U. S. Patent 2,409,043; Plattner et al., Helv. 31, 603 (1948), leave much to be desired in the matter of obtaining pure 17-bromo-20-keto pregnenes and pregnanes. Indeed, even where these substances have been reported to have been isolated, the yields are poor, and we find that these poor yields are attributable to the contamination of the 17-bromo compounds with 17,21-dibromo compounds and 17,21,21-tribromo compounds. No clean-cut method has hitherto been recorded in the literature for the removal from this mixture of the greatest contaminant; namely, the 17,21-dibromo compounds, yet we find that 17,21-dibromo-20-keto pregnenes and pregnanes always arise on the bromination of 20-keto pregnenes and pregnanes with free bromine, no matter what the quantities or the conditions. It has been claimed, for example, by Marker et al., J. A. C. S., 64, 210 (1942) that pregnanolone gives 17-bromo pregnanolone almost exclusively on treatment with free bromine. In our hands this 17-bromo pregnanolone was impure and was found to be contaminated with its 17,21-dibromo derivative.

It is accordingly, therefore, an object of the present invention to provide a method for preparing substantially pure 17-bromo-20-keto pregnenes and pregnanes.

It is another object of the invention to provide a method for the preparation of 17-bromo-20-keto pregnenes and pregnanes free from contamination by 17,21-dibromo-20-keto pregnenes and pregnanes.

Still another object of the invention is to provide a method for the conversion of 17,21-dibromo-20-keto pregnenes and pregnanes into the corresponding 17-bromo-20-keto pregnenes and pregnanes.

Yet another object of the invention is to provide a method for converting 17,21-dibromo-20-keto pregnenes and pregnanes into the corresponding 17-bromo-20-keto derivatives in the presence of the latter.

A still further object of the present invention is to provide a method for the removal of 17,21,21-tribromo-20-keto pregnenes and pregnanes from the corresponding 17-bromo-20-keto derivatives.

Other objects will be apparent to those skilled in the art.

It has been found that on treatment of 5,6,17,21 - tetrabromopregnane-3β-ol-20-one (V), or its acetate, with an amount of sodium iodide corresponding to greater than three moles of the latter per mole of the former, the tetrabromopregnane is converted almost quantitatively into 17-bromo-20-iodo-5-pregnene-3β-ol-20-one (VI), or its acetate. Marker et al., J. A. C. S., 64, 1276 (1942) treated the tetrabromopregnane with two moles of sodium iodide and thought their product was the 17,21-dibromopregnene (VII). Marker et al. claim this product in U. S. Patent 2,369,065. Repetition of the work of Marker et al. has shown that their product is a mixture of several substances, among which may be some of VII and in which there is definitely a considerable portion of VI, and probably some of the 17-bromo compound as well as some of the 17,21-21-tribromo compound.

Inhoffen, U. S. Patent 2,409,043, 1946, treated the tetrabromopregnane (V) with an amount of sodium iodide that calculates out to be 3.6 moles per mole of the tetrabromo compound and writes his product as the 17,21-dibromo compound (VII).

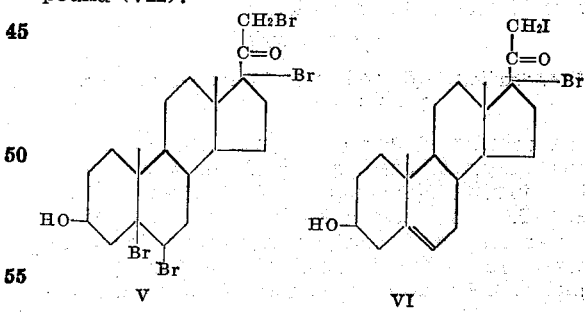

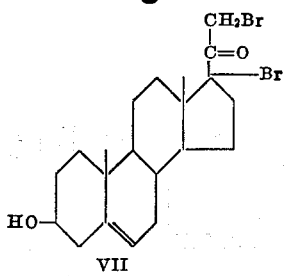

VII

Repetition by us of Inhoffen's experiments shows that the compound he claimed to be VII is almost pure VI.

What is significant for this invention in the above cited errors in the work of Inhoffen and Marker et al. is that the discovery of these errors and, therefore, the discovery of this selective reactivity with sodium iodide has led us to a selective dehalogenation of the pregnenes and pregnanes in question, and we have found that pregnenes and pregnanes of the type represented by Formula VI, namely, the 17-bromo-21-iodo-20-keto pregnenes and pregnanes, are smoothly reduced to the 17-bromo-20-keto-pregnenes and pregnanes of the type II on treatment with sodium bisulfite. Thus, the 21-iodo group in 20-keto pregnenes and pregnanes of the type VI is smoothly replaced by hydrogen on stirring a solution of VI in an organic solvent with an aqueous solution of sodium bisulfite without affecting the 17-bromo group. Therefore, a novel and clean-cut method of selective dehalogenation of compounds like VII has been achieved.

Moreover, since, as stated above, the bromination of 20-keto pregnenes and pregnanes leads to a mixture of substances containing II, V and VIII, a method has been achieved which converts

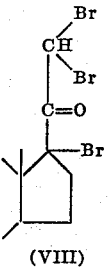

(VIII)

all of V into II even in the presence of considerable quantities of II. Further, it has been found that the solubility of VIII differs so greatly from that of II in hexane, for example, that after removal of V, by its conversion into II, II and VIII can be readily separated from one another.

The procedure outlined above enables one, therefore, to prepare substantially pure 17-bromo-20-keto pregnenes and pregnanes, an accomplishment which greatly facilitates the preparation of valuable therapeutic compounds like the 17α-hydroxy steroids. The following examples illustrate the invention.

EXAMPLE I

Preparation of 17-bromo-21-iodo-5-pregnene-3β-ol-20-one acetate

A solution of 96.4 g. pregnenolone acetate in 1900 cc. glacial acetic acid is treated with 1 mole bromine in acetic acid at 20° C., followed by 1 cc. 32% HBr in acetic acid and then slowly with 2 moles bromine in acetic acid at room temperature. After the addition of bromine is completed, the mixture is held at 40° C. for 15 minutes to complete the reaction, and then cooled to room temperature, filtered and washed with ether. The yield of 5,6,17,21-tetrabromopregnane-3β-ol-20-one acetate is 151.3 g., M. P. 176–177° C. dec. Anal.—Calc. for $C_{23}H_{32}O_3Br_4$: C=40.85; H=4.77. Found: C=40.43; H=4.85.

A solution of 17.0 g. 5,6,17,21-tetrabromopregnane-3β-ol-20-one acetate in 205 cc. benzene is treated with a solution of 45 g. sodium iodide in 205 cc. ethanol at room temperature for 24 hours. The reaction mixture is diluted with water and extracted with ether. The ethereal benzene solution is washed with 1% sodium hydroxide solution to remove free iodine, washed with water to neutrality and dried over sodium sulfate. Upon concentrating the solution under vacuo to a volume of 40 cc. and diluting with 80 cc. warm methanol, there is obtained 10.3 g. 17-bromo-21-iodo-5-pregnene-3β-ol-20-one acetate, M. P. 154° C. dec. Anal.—Calc. for $C_{23}H_{32}O_3BrI$: C=49.03; H=5.74. Found: C=48.83; H=5.72.

EXAMPLE II

Reduction of 17-bromo-21-iodo-5-pregnene-3β-ol-20-one acetate with sodium bisulfite A solution of 5.9 g. 17-bromo-21-iodo-5-pregnene-3β-ol-20-one acetate in 50 cc. benzene and 50 cc. ether is shaken with 30 cc. 10% aqueous sodium bisulfite solution. Free iodine is liberated in the ether benzene layer, whereupon the mixture is shaken to remove the iodine. As iodine is again liberated the mixture is again shaken. This procedure is repeated until no more iodine is liberated. From 15 to 30 minutes is required to complete the reduction. The ethereal solution is washed with 1% aqueous sodium carbonate solution, with water to neutrality and then dried over sodium sulfate. The solution is concentrated under vacuo to 10 cc. volume and diluted with 25 cc. warm methanol. There is obtained 3.8 g., 17-bromo-5-pregnene-3β-ol-20-one acetate, M. P. 134–140° C.

Crystallization from methanol raises the melting point to 145–146° C. Anal.—Calc. for $C_{23}H_{33}O_3Br$: C=63.15; H=7.6. Found: C=62.77; H=7.48.

EXAMPLE III 5,16-pregnadiene-3β-ol-20-one acetate from 17-bromo-5-pregnene-3β-ol-20-one acetate A solution of 18.0 g. 17-bromo-5-pregnene-3β-ol-20-one acetate in 100 cc. collidine is refluxed for 6 hours. The cooled mixture is diluted with ether and extracted with 15% aqueous hydrochloric acid to remove the collidine and then washed with water to neutrality. The ethereal solution is dried over sodium sulfate and concentrated to the point of crystallization and then chilled and filtered. There is obtained 10.8 g. 5,16-pregnadiene-3β-ol-20-one acetate, M. P. 172–174° C.

EXAMPLE IV

Preparation of 17-bromo-5-pregnene-3β-ol-20-one acetate

A solution of 151.3 g. 5,6,17,21-tetrabromopregnane-3β-ol-20-one acetate in 1800 cc. benzene is treated with a solution of 400 g. sodium iodide in 1800 cc. ethanol at room temperature for 24 hours. The reaction mixture is diluted with water and extracted with ether. The ethereal benzene solution is washed with 1% sodium hydroxide solution to remove free iodine and then washed with water to neutrality. The ethereal benzene solution is shaken with 300 cc. 10% sodium bisulfite solution. Free iodine is liberated in the ether-benzene layer, whereupon the mixture is again shaken. This procedure is repeated until no more iodine is liberated. The ethereal solution is washed with 1% aqueous sodium carbonate solution, with water to neutrality and then dried over sodium sulfate. The solution is concentrated under vacuum to 150 cc. total volume and diluted with 265 cc. warm methanol. There is obtained 84 g. of crude 17-bromo-5-pregnene-3β-ol-20-one acetate, M. P. 133°–139°.

EXAMPLE V

Removal of high-melting 17,21,21-tribromopregnenolone acetate

One gram of crude 17-bromo pregnenolone acetate is taken up in 5 cc. hexane and allowed to crystallize at room temperature, whereupon 0.1 g. hard prisms, M. P. 190°, separated. Anal.—Calc. for $C_{23}H_{31}O_3Br_3$: $C=46.41$; $H=5.25$. Found: $C=46.64$; $H=5.39$. The hexane liquor is concentrated and crystallized from methanol. There is obtained 0.8 g. 17-bromo pregnenolone acetate, M. P. 143°

EXAMPLE VI

Repetition of Marker's experiment on bromination of pregnenolone acetate and treatment with 2 moles sodium iodide A solution of 0.872 g. sodium iodide (2.0 moles) in 20 cc. ethanol was added to a boiling suspension of 2.9 g. 5,6,17,21-tetrabromopregnenolone acetate in 300 cc. ethanol and refluxed for 1 hour. The solution was cooled, diluted with water and extracted with ether. The ethereal solution was washed with 5% sodium thiosulfate solution to remove free iodine and then washed with water. The colorless ethereal solution was divided into two equal parts. Part I was dried and concentrated under vacuum to 0.7 g. solid residue and crystallized from ether-methanol yielding 0.47 g., M. P. 100°–110° C. A portion of this material was fused with sodium and when qualitatively tested for iodine via the sodium nitrite test showed that iodine was present. A portion was recrystallized 3 times from ether methanol, melted at 148° and did not show a depression in melting point when admixed with 17-bromo-21-iodo pregnenolone acetate.

Part II of the original ethereal solution was shaken with 10% aqueous sodium bisulfite solution. Free iodine was liberated in ethereal layer. This was repeated 3 times until no more iodine was liberated. The solution was washed with 1% aqueous sodium carbonate solution, with water to neutrality, and then dried and concentrated to a solid residue yielding 0.33 g., M. P. 106°–115°.

EXAMPLE VII

Repetition of Inhoffen's experiment

A solution of 1.0 g. tetrabromopregnenolone acetate in 30 cc. benzene was treated with a solution of 0.8 g. sodium iodide (3.6 moles) and refluxed for 2 hours. The solution was cooled, diluted with water and extracted with ether and finally washed with sodium thiosulfate solution and the water. Upon concentrating under vacuum and crystallizing, there is obtained 0.6 g. material, M. P. 130–132°, dec. This was recrystallized 3 times and then melted at 146° dec. and did not show a depression in melting point when admixed with 17-bromo-21 iodo pregnenolone acetate. The optical rotation of this material is $[\alpha]_D^{26}=-53°$ and that of 17-bromo-21 iodo pregnenolone acetate is $[\alpha]_D^{26}=-54°$. Anal.—Calc. for $C_{23}H_{32}O_3BrI$: $C=49.03$; $H=5.73$. Found: $C=49.25$; $H=5.69$.

EXAMPLE VIII

Preparation of 16-allopregnenolone

A solution of 2.5 g. allopregnanolone acetate in 75 cc. glacial acetic acid containing 2 drops 32% HBr is treated slowly at 25°–30° C. with 15.4 cc. of a 1 M solution of bromine in acetic acid. After the solution has stood at 30° for 15 minutes, water is added slowly until precipitation is complete. The crystalline mass is filtered, washed with water and dried in a hot air oven. The crude bromination product is crystallized from acetone-methanol yielding 2.9 g., M. P. 165–170°.

To a solution of 3.0 g. of the thus formed 17,21-dibromoallopregnanolone in 36 cc. benzene is added a solution of 5.1 g. sodium iodide in 36 cc. ethanol and the mixture allowed to stand at room temperature for 24 hours. The reaction mixture is diluted with water and extracted with ether. The ethereal benzene solution is washed with 1% sodium hydroxide solution to remove free iodine, then washed with water to neutrality. The 17-bromo-21-iodo-allopregnanolone acetate, M. P. 136°–138° dec. need not be isolated and can be reduced directly. The ethereal-benzene solution is shaken with 20 cc. of 10% aqueous sodium bisulfite solution. Free iodine is liberated in the ether-benzene layer, whereupon the mixture is again shaken. The procedure is repeated until no more iodine is liberated. The solution is then washed with 1% aqueous sodium carbonate solution and with water to neutrality and then dried and concentrated. The residue is taken up in ether and crystallized. There is obtained 0.9 g. M. P. 197°–199° dec. of a tribromo derivative by-product. Calc. for $C_{23}H_{32}O_3Br_3$: $C=46.33$; $H=5.41$. Found: $C=46.51$; $H=5.55$.

From the liquor there is obtained 1.2 g. M. P. 112–115° C., 17-bromo-allopregnanolone acetate. Crystallization from methanol raises the melting point to 128° C.

A solution of 0.4 g. 17-bromo-allopregnanolone acetate in 4 cc. collidine is refluxed for 3 hours. The cooled mixture is diluted with ether and extracted with 15% aqueous hydrochloric acid to remove collidine and then washed with water to neutrality. The ethereal solution is dried, concentrated and petroleum ether is added. There is readily obtained 0.2 g. of 16-allopregnenolone acetate, M. P. 158°. Crystallized from acetone, it melts at 162°.

EXAMPLE IX

The preparation of 3α,12α-diacetoxy-16-pregnene-20-one

To a solution of 1.0 g. of 3α,12α-diacetoxypregnane-20-one in 8 cc. of acetic acid, containing one drop of 32% HBr in acetic acid and a few crystals of anhydrous aluminum chloride, there was added, dropwise, 0.42 g. of bromine in 4 cc. of acetic acid at room temperature. After complete absorption of bromine, the solution was poured into water and the white solid separated by filtration. After drying, the washed solid weighed 1.16 g. This material was dissolved in 13 cc. of benzene and treated with a solution of 1.0 g. of sodium iodide at room temperature for twenty-four hours. The iodinecolored solution was diluted with ether, washed with water, 10% sodium bisulfite solution, dilute sodium carbonate and finally water. The dried solution was concentrated to a heavy sirup which was dissolved in 8 cc. of sym-collidine. After a reflux period of three hours, the mixture was diluted with ether and washed with dilute hydrochloric acid, water, dilute alkali and then water. The dried solution was concentrated and by careful crystallization from ether-petroleum ether there was obtained the impure 3α,12α-diacetoxy-16-pregnene-20-one, M. P. 185–190° C. Recrystallization gave pure material melting at 193° C. This material showed an ultraviolet absorption maximum at 240 mμ, typical of such an α,β-unsaturated ketone.

It can readily be seen from the foregoing that a clean-cut procedure is provided for the production of 17-bromo-20-keto pregnenes and pregnanes. It will be understood, however, that many variations may be made in carrying out the invention. As pointed out the procedures of both Marker and Inhoffen produce some 17-bromo-21-iodo compound but it is preferable to use sufficient sodium iodide to reduce any bromo groups present reducible by sodium iodide, as well as to replace the 21-bromine atom by iodine. As indicated, however, the 17-tertiary bromo group is not affected by the sodium iodide. It will, of course, be understood that in any case the 17-bromo-21-iodo-20-keto compounds, whether in admixture or otherwise, may be treated with sodium bisulfite to replace the 21-iodo group with hydrogen. Where insufficient bromine has been initially used to brominate all of the starting material, it may, of course, be recovered.

The invention is obviously not limited to the treatment of the specific steroids mentioned in the examples. Thus, if desired, pregnenes and pregnanes having the 3-keto group may be employed. Also pregnenes and pregnanes, such as those having oxygenated functions at other positions in the molecule, such as at the 11 or 12 positions, may be treated in accordance with the present invention.

It is not necessary to treat the acetate where the 3-hydroxy compounds are employed. However, bromination in acetic acid is a convenient procedure and this procedure inherently produces acetylation. Bromination in chloroform may be carried out, however, on the free hydroxy compounds. Also if the acetate group is undesirable, other esters may be formed, such as the benzoate, etc. and the bromination carried out in acetic acid.

The 17-bromo-20-keto compounds produced by the present invention may be readily dehydrobrominated to yield compounds containing a 16–17 double bond, which may then be readily converted to the 16,17-oxido-compounds. The oxido compounds upon treatment with lithium aluminum hydride, as set forth in co-pending application Serial No. 93,638, filed May 16, 1949, yield compounds possessing 17α-hydroxy and 20-hydroxy groups. If 17α-hydroxy-20-keto compounds are desired, the 20-keto group may readily be protected during the reduction of the oxido group as set forth in co-pending application Serial No. 108,658, filed August 4, 1949. Since many of the active cortical hormones possess the 17α-hydroxy group, it is readily seen that the present invention is valuable in the partial synthesis of such compounds from the more abundant steroid compounds which do not possess this group.

Having described the invention, what is claimed is:

1. The process which comprises treating a steroid compound selected from the class consisting of 17-bromo-21-iodo-20-keto pregnenes and pregnanes with sodium bisulfite.

2. The process which comprises treating 17-bromo-21-iodo-20-keto pregnenes with sodium bisulfite.

3. The process of claim 2 in which the double bond in the pregnene involves the number 5 carbon atom.

4. The process which comprises treating an acetate of a 17-bromo-21-iodo-5-pregnene-3-ol-20-one with sodium bisulfite.

5. The process which comprises treating 17-bromo-21-iodo-5-pregnene-3-ol-20-one acetate with sodium bisulfite.

6. The process which comprises treating an acetate of a 17-bromo-21-iodo-pregnane-3-ol-20-one with sodium bisulfite.

7. The process which comprises treating a steroid compound selected from the class consisting of 20-keto pregnenes and pregnanes with sufficient bromine to form a 17-bromo-21-bromo-20-keto compound, and treating the resulting 17-bromo-21-bromo-20-keto compound with sufficient sodium iodide to replace the 21-bromine atom with iodine, and treating the resulting 21-iodo compound with sodium bisulfite.

8. The process which comprises treating a steroid compound selected from the class consisting of 20-keto pregnenes and pregnanes with sufficient bromine to form a 17-bromo-21-bromo-20-keto compound, treating the resulting mixture of brominated steroids with sufficient sodium iodide to replace the 21-bromine atom with iodine, treating the mixture containing the 21-iodo derivative with sodium bisulfite, and recovering the resulting 17-bromo-20-keto steroid from the mixture.

9. The process which comprises treating a mixture containing 17-bromo-21-bromo-20-keto and 17-bromo-20-keto derivatives of a steroid selected from the class consisting of pregnenes and pregnanes with sufficient sodium iodide to replace the 21-bromine atom with iodine, treating the resulting mixture containing the 21-iodo compound with sodium bisulfite, and then recovering 21-bromo-20-keto steroid from the resulting mixture.

10. The process which comprises treating a mixture containing 17-bromo-21-bromo-20-keto, 17-bromo-20-keto and 17-bromo-21,21-dibromo-20-keto derivatives of a steroid selected from the class consisting of pregnenes and pregnanes with sufficient sodium iodide to replace the bromine of the 17-bromo-21-bromo-derivative by iodine, treating the resulting mixture with sodium bisulfite and then fractionally crystallizing any 17-bromo-21,21-dibromo-20-keto compound from a solution of the mixture resulting from the sodium bisulfite treatment.

PERCY L. JULIAN.
WILLIAM J. KARPEL.

References Cited in the file of this patent

UNITED STATES PATENTS

| Number | Name | Date |
|---|---|---|
| 2,369,065 | Marker | Feb. 6, 1945 |